United States Patent [19]

Gilbert et al.

[11] 4,193,112

[45] Mar. 11, 1980

[54] MICROCOMPUTER DATA DISPLAY COMMUNICATION SYSTEM WITH A HARDWIRE EDITING PROCESSOR

[75] Inventors: Judson T. Gilbert, Hialeah; George R. Harrison; Alan R. Holbrook, both of Miami; Michael Levy, Pembroke Pines; John B. Scott, Miami Springs; Harris K. Swan, Miami, all of Fla.

[73] Assignee: Racal-Milgo, Inc., Miami, Fla.

[21] Appl. No.: 651,249

[22] Filed: Jan. 22, 1976

[51] Int. Cl.[2] .......... G06F 3/14; G06F 9/00; G06F 13/00

[52] U.S. Cl. .......... 364/200

[58] Field of Search .......... 340/172.5, 324 A, 324 AD, 340/711, 723, 724, 789, 798, 799, 800, 803; 445/1; 364/200 MS File, 900 MS File

[56] References Cited

U.S. PATENT DOCUMENTS

| | | | |
|---|---|---|---|
| 3,602,893 | 8/1971 | Hodges | 364/900 |
| 3,623,005 | 11/1971 | Roberts, Jr. | 340/172.5 |
| 3,641,555 | 2/1972 | Griffin | 340/324 A |
| 3,641,558 | 2/1972 | Cook et al. | 340/172.5 X |
| 3,675,208 | 7/1972 | Bard | 340/172.5 |
| 3,688,275 | 8/1972 | Fredrickson et al. | 340/172.5 |
| 3,696,392 | 10/1972 | Fossum et al. | 340/172.5 X |
| 3,701,988 | 10/1972 | Allaart | 340/172.5 X |
| 3,750,147 | 7/1973 | Gregg | 340/172.5 X |
| 3,778,775 | 12/1973 | Haring et al. | 364/900 |
| 3,798,610 | 3/1974 | Bliss et al. | 340/172.5 |
| 3,800,288 | 3/1974 | Russell et al. | 340/172.5 |
| 3,810,107 | 5/1974 | Goldman et al. | 340/172.5 |
| 3,848,232 | 11/1974 | Leibler et al. | 340/172.5 |
| 3,872,446 | 3/1975 | Chambers | 364/200 |
| 3,903,510 | 9/1975 | Zobel | 364/900 |
| 3,906,480 | 9/1975 | Schwartz et al. | 340/324 AD |
| 3,909,818 | 9/1975 | Dalke et al. | 340/324 AD |
| 3,973,244 | 8/1976 | Lovercheck et al. | 364/200 |
| 4,057,849 | 11/1977 | Ying et al. | 364/200 |
| 4,070,710 | 1/1978 | Sukonick et al. | 364/900 |
| 4,127,851 | 11/1978 | Middel | 340/324 AD |

*Primary Examiner*—Melvin B. Chapnick
*Attorney, Agent, or Firm*—Jackson, Jones & Price

[57] ABSTRACT

A data display communication system wherein data generated locally by a keyboard or generated remotely and communicated by modems is displayed on a display device. Data displayed on the screen can be edited or reformatted prior to storage, print-out, or transmission to a remote location. Data communicated between storage and the central processing unit is handled in blocks that make up one full line of characters on the display device. All edit and format functions are performed on the basis of these blocks of data. Timing for the display device controls the operation of the system. The communication system utilizes a microprocessor operating in conjunction with specific hardware logic to handle display oriented operations.

22 Claims, 20 Drawing Figures

CHANNEL BIT LOCATIONS

INPUT CHANNELS

| | MSB-7 MOST SIGNIFICAN BIT | 6 | 5 | 4 | 3 | 2 | 1 | 0-LSB LEAST SIGNIFICANT BIT |
|---|---|---|---|---|---|---|---|---|
| 0 | KEY BOARD DATA IN | | | | | | | |
| 1 | SERIAL CHANNEL DATA IN | | | | | | | PARITY ERROR |
| 2 | SEND LATCH | RECEIVE LATCH | LOCAL LATCH | S/R LATCH | INTERRUPT LATCH | FROM SEND LATCH | PRINT ON LINE LATCH | PRINT LOCAL LATCH |
| 3 | WORD INSERT LATCH | UNDERLINE LATCH | HIGHLIGHT LATCH | FORM ENTER LATCH | TAB (OP RAM) | UNDERLINE (OP RAM) | HIGHLIGHT (OP RAM) | PRT·FE + SD·PRT |
| 4 | TRANSMIT HOLDING REGISTER EMPTY | CLEAR TO SEND | DATA SET READY | DATA CARRIER DETECT | SECONDARY SEND DATA | SECONDARY RECEIVE DATA | REQUEST TO SEND | RECEIVE DATA READY |
| 5 | NOT USED—SPARE CHANNEL FOR FUTURE EXPANSION | | | | | | | |
| 6 | INPUT DATA AS SPECIFIED BY THE INPUT/OUTPUT CONTROL ADDRESS REGISTER | | | | | | | |
| 7 | KEYBOARD DATA READY | START OF WINDOW LOAD TIME | PRINTER READY | PRINTER PWR. OFF + OPR. INTERVENTION | CRT POWER ON | RING INDICATOR | BLANK LINE SEARCH BIT | PROTECT SEARCH BIT |

OUTPUT CHANNELS

| | MSB-7 MOST SIGNIFICANT BIT | 6 | 5 | 4 | 3 | 2 | 1 | 0-LSB LEAST SIGNIFICANT BIT |
|---|---|---|---|---|---|---|---|---|
| 1 | SEND LATCH | RECEIVE LATCH | LOCAL LATCH | S/R LATCH | INTERRUPT LATCH | FROM SEND LATCH | NOT USED | |
| 2 | WORD INSERT LATCH | UNDERLINE LATCH | HIGHLIGHT LATCH | FORM ENTER LATCH | NOT USED | | PRINT ON LINE LATCH | PRINT LOCAL LATCH |
| 3 | PRINTER DATA OUT | | | | | | | PARITY ERROR |
| 4 | NOT USED | SERIAL CHANNEL DATA OUT | | | | | | |
| 5 | NOT USED | | MAJIK BOX MEMORY ADDRESS REGISTER HIGH | | | | | |
| 6 | MAJIK BOX MEMORY ADDRESS REGISTER LOW | | | | | | | |
| 7 | INPUT-OUTPUT CONTROL ADDRESS REGISTER | | | | | | | |
| 8 | OUTPUT DATA AS SPECIFIED BY THE INPUT/OUTPUT CONTROL ADDRESS REGISTER | | | | | | | |
| 9 | EXECUTE TIMER ON | NOT USED | | | | | | |
| 10 | NOT USED | UNDERLINE | HIGHLIGHT | PROTECT | NOT USED | | | |
| 11 | PRINTER PWR. OFF | PRINTER PWR. ON | DATA TERMINAL READY OFF | DATA TERMINAL READY ON | SECONDARY SEND DATA OFF | SECONDARY SEND DATA ON | REQUEST TO SEND OFF | REQUEST TO SEND ON |
| 12 | AUDIBLE ALARM—BIT STATUS IS "DON'T CARE" | | | | | | | |
| 13 | NOT USED | | MAJIK BOX MULTI-LINE/SINGLE LINE | MAJIK BOX MODE B/A | MAJIK BOX READ/WRITE | MAJIK BOX WRITE OP CODE | | |
| 14 | NOT USED | | | | | PRINTER FIFO CLEAR | CLEAR MODEM FIFO | CLEAR UART |
| 15 | START OF WINDOW MEMORY ADDRESS REGISTER LOW | | | | | | | |
| 16 | NOT USED | | START OF WINDOW MEMORY ADDRESS REGISTER HIGH | | | | | |

FIG. 4

READ MODE A

READ MODE B

CLEAR-MODE A

CLEAR-MODE B

MICROCOMPUTER DATA DISPLAY COMMUNICATION SYSTEM WITH A HARDWIRE EDITING PROCESSOR

BACKGROUND OF THE INVENTION:

The present invention relates to improvements in data display communication systems, and more particularly, pertains to new and improved editing and formatting techniques in data display communication systems wherein data communicated between remote points or stored in a memory may be displayed as desired by an operator for the purpose of editing such data.

In the field of data display communication systems wherein such display devices as cathode-ray tubes (CRTs) are utilized, it has been the practice to employ dedicated hardware logic for performing the various required functions of the display communication system. Even with the advent of microcomputers, prior art data display communication systems restricted themselves to hardwire logic. This course was chosen in order to provide a product that was sufficiently fast in responding to an operator, thereby preventing an aesthetically intolerable display delay between functions, and at the same time be cost effective in the market place. In the past, this balancing between speed and cost always resulted in a microcomputer not being utilized in data display communication systems. Though the less sophisticated microcomputers are relatively inexpensive, they are also too slow for such an application.

Even with an all hardwire logic processing unit, prior data display communication systems have considerable difficulty in obtaining operating speeds for the performance of various editing functions that prevented aesthetically unpleasant display flicker and delay between operations. Besides these shortcomings, the prior art hardwire dedicated logic data display communication systems are cumbersome and difficult to troubleshoot and repair. The data display communication system of the present invention overcomes these difficulties by utilizing off-the-shelf microprocessors in combination with unique hardwire logic to provide a flexible, extremely fast operating, modular type, data display communications system.

OBJECTS AND SUMMARY OF THE INVENTION

An object of this invention is to provide a data display communication system that provides the flexibility and cost advantage of microprocessors without the disadvantage of slow operating performance.

Another object of this invention is to provide a data display communication system that facilitates the composition, verification and correction of data.

A further object of this invention is to provide a data display communication system that facilitates utilizing standardized unvariable text stored in memory, along with variable data.

These objects and the general purpose of this invention are accomplished as follows. A programmable microprocessor and a unique hardwire logic function unit, for convenience called a "majik box" are interrelated in a manner that delegates all functions related to data display and requiring fast execution to the majik box and all other functions to the processor. Display related functions are performed by the majik box on a data block basis, each block being equal to one line of characters on the display. Timing for the majik box operation is controlled by the timing requirements of the display unit. All composition, verification and correction of data is accomplished on a line by line basis without interfering with the visual display of the data. Each character displayed on the screen has associated with it, in memory, information with dictates whether that character is to be highlighted, protected or underlined. Each character also carries with it information that dictates whether a tab stop or a cursor is to be located at the screen position of that character.

BRIEF DESCRIPTION OF THE DRAWINGS

Other objects and features of the invention will become apparent to those skilled in the art as reference is made to the following description of a preferred embodiment of the invention as illustrated in the accompanying sheets of drawings in which like referenced numerals designate like parts throughout the figures thereof and wherein:

FIG. 4 is a chart illustrating the preferred information content of the eight input channels and the sixteen output channels of the central processor of FIG. 1.

DESCRIPTION OF THE PREFERRED EMBODIMENTS

Data Display Communication System

Figure 1:
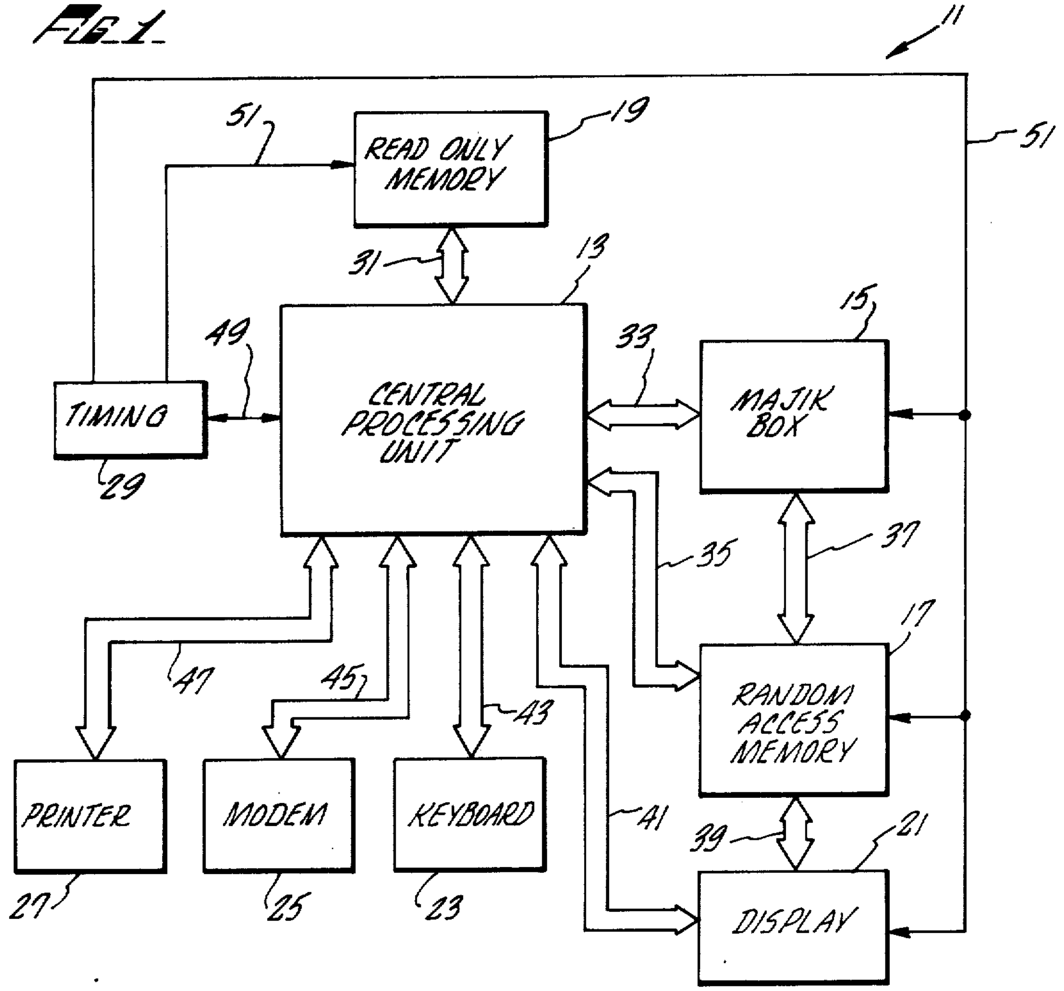
FIG. 1 is a block diagram illustration of an exemplary data display communication system.

The present invention is particularly adapted to a data display communication system 11 of the type illustrated in FIG. 1. This data display communication system may consist of a central processing unit (CPU) 13 that functions in accordance with a program procedure stored in its memory (ROM) 19. Communication between the processor and the ROM is by way of data bus 31. The CPU 13 communicates with the various peripheral devices, such as printer 27, modem 25 and keyboard 23. It sends data to printer 27 and receives signals therefrom over data bus 47. It receives and sends data and command signals to modem 25 over data bus 45. Modem 25, as is well known in the art, would be connected to a communication link (not shown) whereby the CPU 13 would be able to communicate with other processing units connected to this communication link. The keyboard unit 23 can enter data into the CPU 13 and generally communicates with the CPU over bus 43.

The CPU 13, as is well known for many computers in the present state of the art, can perform various logic manipulations on data received by it from data sources such as the modem 25, keyboard 23 or the random access memory (RAM) 17.

The RAM 17 is a large, preferably integrated circuit type memory which acts as the on-line store for the data display communication system 11. Data stored in the memory 17 is communicated to the CPU 13, the majik box 15 or a display unit 21 under the control of the CPU 13. What information is to be visually displayed on the display device 21, which may be any well known type, such as a cathode-ray tube type, is dictated by the CPU 13. Memory address information supplied to the display device 21 over bus 41 indicates the addresses of the information to be retrieved or read from memory 17 by way of data bus 39. The CPU can read or write information into the random access memory by way of data bus 35.

The majik box 15, upon command from the CPU 13 over data bus 33, performs various logic operations on data read from the RAM 17 over data bus 37. The operations, as will be more fully described hereinafter, of the majik box 15 are designed around the editing of data that is being displayed by the display device 21. Whenever a display edit function is called for by the CPU 13 on its own or by initiation of an operator through the keyboard 23, the majik box 15 is actuated by the CPU 13, over data bus 33, to exercise that particular function. The CPU is switched into an interrupt condition until that function is completed by the majik box 15. The majik box 15 performs its designated function much faster than the CPU 13 would be capable of.

Central Processing Unit

Figure 2:
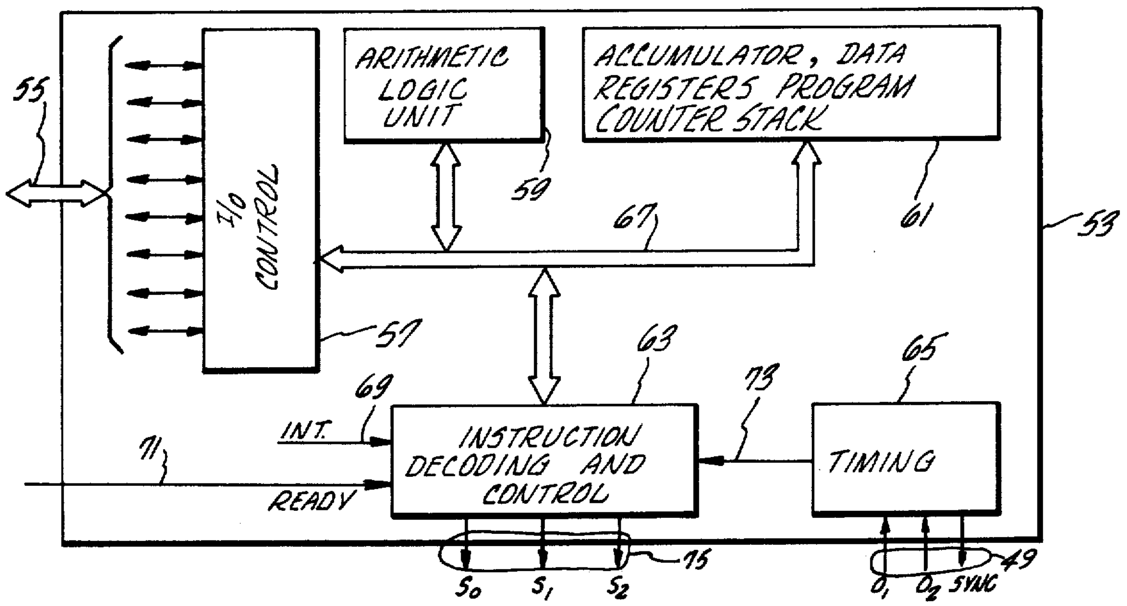
FIG. 2 is a block diagram illustration of a typical off-the-shelf microcomputer that may be utilized with the data display communication system of FIG. 1.

The heart of the CPU 13 is a microcomputer 53 of a type well known in the art, the Intel 8008 eight-bit parallel microcomputer being one example. The Intel microcomputer, as well as the microcomputers of other computer manufacturers generally contains a hardwire arrangement as illustrated in FIG. 2. The microcomputer 53 generally has an input/output (I/O) control section 57 that supplies and receives data over an eight-bit parallel data bus 55. The I/O control section 57 is connected to an arithmetic logic unit 59, a section of accumulators, data registers and program counter stack logic 61, and instruction decoding and control logic 63 by an internal data bus 67. Timing logic 65 supplies the internal logic of the microcomputer with appropriate clocking signals over line 73 and synchronizes the external operations with this clocking over cable 49.

Instruction decoding and control logic 63 generates state signals over cable 75 to external logic, as will be more fully described hereinafter. The state of the microcomputer is interrupted if the signal on ready line 71 is dropped for the period of time that the signal on the ready line is low. The ready signal on line 71 is dropped whenever the microcomputer 53 instructs the majik box 15 to perform a function, as will be more clearly seen hereinafter.

The timing logic 65 of the microcomputer 53 is controlled by the timing logic 29 (FIG. 1) of the data display communication system, the two timing control logic circuits being interconnected by cable 49. The timing control logic 29 insures that the display unit 21 gets priority over all the other units peripheral to the CPU 13, as well as the CPU. How this relates to the operation of the majik box will be more fully described hereinafter.

Figure 3:
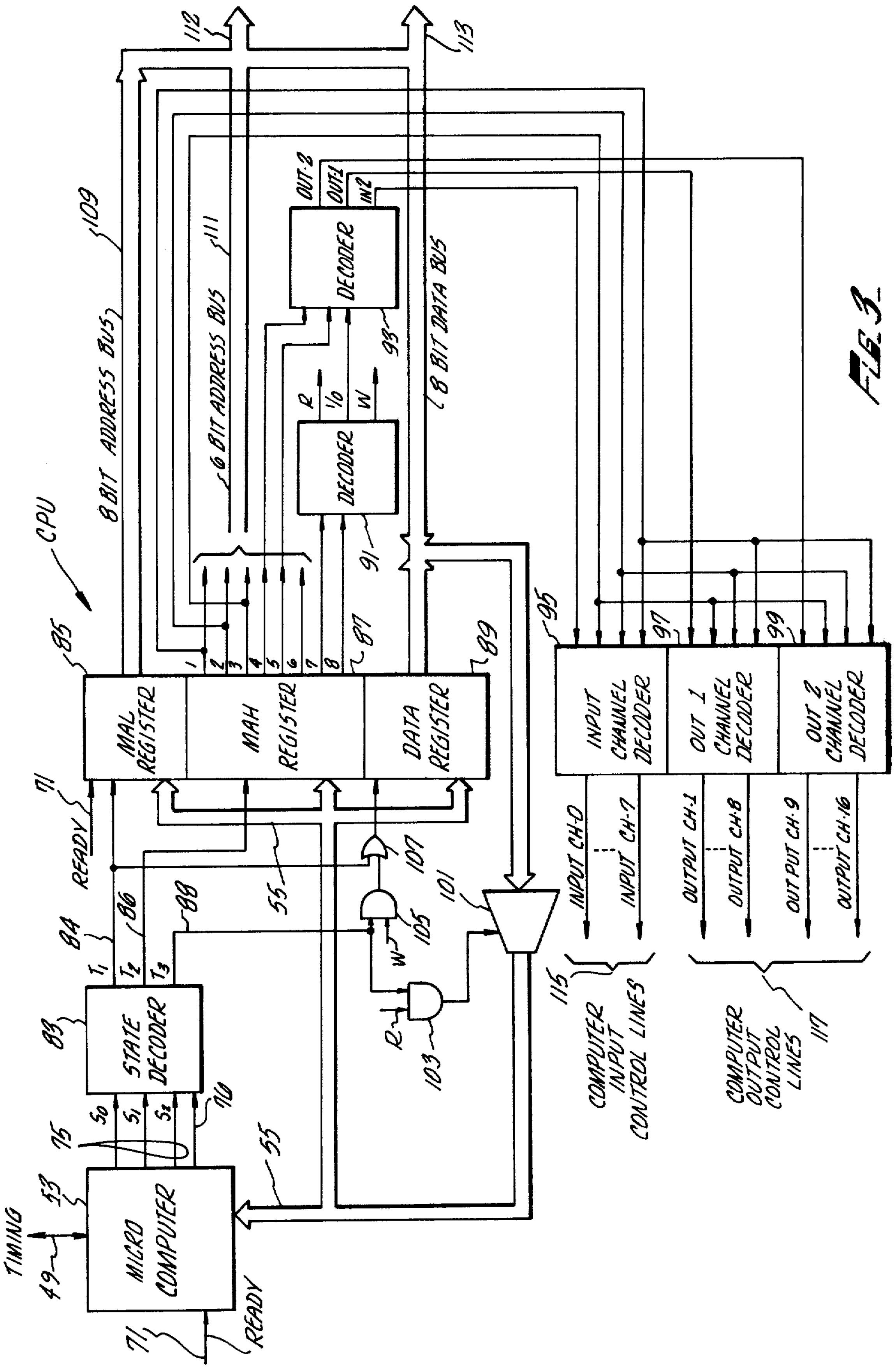
FIG. 3 is a block and logic diagram illustration of the central processor unit of the data communications system of FIG. 1.

The microcomputer 53 (FIG. 3) receives timing signals over lines 49 that are subservient to the timing control signals supplied to the display unit and is interrupted in its process by the ready control signal on line 71 which is generated whenever a majik box function is to be performed. The microcomputer 53 functions in this environment to provide state signals on cable 75 to the state decoder 83, indicating the state that it is in and whether it is moving address, instruction, or memory data on its data bus 55. The state decoder 83 receives the three-bit $S_0$, $S_1$ and $S_2$ state code on parallel lines 75 and a sync signal (not shown), and generates the appropriate signals $T_1$, $T_2$ or $T_3$ on lines 84, 86 and 88, respectively, depending on the bit combination received.

If the signal on ready line 71 to the microcomputer 53, which forms a part of the CPU 13 is indicative of the situation that the majik box is not performing an operation, the microcomputer conducts its processes, which includes the receiving and outputting of data on data bus 55.

Assuming that the state decoder 83 received a combination of state bits on cable 75 that directed it to generate a $T_1$ enabling signal on line 84, the eight-bit memory address register-low section (MAL) 85 will be able to receive the information placed on data bus 55. Also, the data register 89 is enabled through OR gate 107 to receive information from data bus 55. The output signal that consecutively follows a $T_1$ enabling signal is the $T_2$ enabling signal on line 86 which enables the eight-bit memory address register-high section (MAH) 87 to receive eight-bits of data from the data bus 55. The contents of memory address registers 85 and 87 make up a fourteen-bit address for addressing the random access memory (RAM) 17 (FIG. 1), only six-bits from MAH register 87 being utilized as address bits. The two remaining bits in MAH register 87 are decoded by decoder 91 to provide a read control signal, an I/O operations signal, or a write control signal. In other words, the state of the two-bits in positions 7 and 8 of the MAH register 87 determines whether a read operation, a write operation or just a general I/O operation is to be performed. The I/O signal from the decoder 91 is supplied to another decoder 93, which, in combination with another two-bits from MAH register 87 determines whether channel decoder 95, channel decoder 97 or channel decoder 99 is to be activated.

If the two-bits received by decoder 91 from MAH register 87 indicates either a read or write operation, the contents of MAL register 85 and MAH register 87 are used to address the RAM 17. If the two-bits received by decoder 91 from MAH register 87 indicates an I/O operation is to be performed, the data received by register 89 at $T_1$ is transferred to the appropriate location in the system, as directed by the signals on the I/O control cables 115, 117. The destination of the data in register 89 is determined by the data bits received at $T_2$ by MAH register 87, in a manner that will be more fully explained hereinafter.

If the state decoder 83 generates a $T_3$ signal on line 88, this signal will either enable the eight-bit register 89 to accept data from the bus 55 or enable the multiple input gate 101 to pass data from the data bus 113 into the microcomputer 53. Whether the data register 89 or the gate 101 is enabled depends on the write input to AND gate 105 and the read input to AND gate 103. These signals come from the decoder 91. Thus, it can be seen that if a memory read or write operation is to be performed, such operation is enabled after the memory address is loaded into registers 85 or 87. For example, if a write operation is to be performed, MAL register 85 is loaded first and MAH register 87 is loaded second. The data to be written into that memory location is loaded into the data register 89 third. As the data is loaded into the register, it overwrites any information already there. For a read operation, MAL register 85 is loaded first, MAH register 87 is loaded second, and the data read from memory is passed by gate 101 into the microcomputer 53.

In the instance when an I/O operation that is not a read or write operation is performed, such as data transfer to or from a peripheral device, such as the modem, majik box, printer, or keyboard, the data register 89 is enabled by way of OR gate 107 at the occurrence of the $T_1$ signal on line 84. At the occurrence of the $T_2$ signal on line 86 enabling MAH register 87, the decoder 91 generates an I/O signal to the decoder 93. The decoder 93, as already noted, enables either input channel decoder 95, first output channel decoder 97 or the second output channel decoder 99. The particular channel line to be activated out of the enabled decoder is determined by the bit combination received from MAH register 87. Assuming, for example, that the input channel decoder 95 is enabled by decoder 93, the bit combination on the other three input lines to the input channel decoder 95, which are the first, second and third bit positions in MAH register 87, would determine which one of the eight input channel control lines is activated. Upon activating any one of these input channel control lines, the various peripheral devices connected to the central processing unit are instructed to send data over data bus 113, to data register 89.

If a transmit type of I/O operation, rather than a receive I/O operation is contemplated, data is actually present on the data bus 55 at the $T_1$ enabling signal appearance on line 84, thereby causing data to be loaded into the data register 89. Upon loading of the MAH register 87 at the occurrence of a $T_2$ signal on line 86, the decoder 91 supplies an I/O signal to decoder 93 which selects channel decoder 97 or channel decoder 99. Both channel decoders operate in the same manner. Assume that channel decoder 97 is selected by an enabling signal being generated by decoder 93 on "out 1" line, the bit content in bit positions 1, 2 and 3 of MAH register 87 determine which one of the eight output channels control lines will have a signal applied thereto. Each one of the output channel control lines 1 through 8, enables its respective peripheral device to receive the data stored in data register 89, by way of data bus 113.

From the above, it can be seen, that the input channel decoder 95 generates a plurality of computer input control signals on the computer input control lines 115. Essentially, the signals on these lines determine the source of the input information to be supplied to the CPU 13. Channel decoder 97 and channel decoder 99 have a plurality of 16 computer output control lines 117 emanating therefrom. The signals on these respective lines determine the destination of the information supplied by the CPU 13.

CPU Interaction with Peripherals

FIG. 4 defines the information content of the various input and output channels to the CPU. As can be seen from the graph of FIG. 4, each channel is designated as consisting of an eight-bit byte (word). Physically, this information is conducted by bidirectional bus 113 (FIG. 3), the various channels being multiplexed thereon. Consider first the input channels 0 through 7 for the CPU. Whenever a channel 0 enabling signal is generated by the input channel decoder 95 (FIG. 3), the CPU will accept data from the keyboard. Input channel 1, when enabled, causes the CPU to accept data from the modem. Input channel 2, when enabled, causes the processor to accept various control information from the keyboard. Input channel 3, when enabled, causes the CPU to accept certain other control information from the keyboard. Input channel 4, when enabled, causes the CPU to accept control information from the modem. Input channel 5 is not used. Input channel 6 handles the flow of data from the general purpose registers of the CPU to the microcomputer. Input channel 7, when enabled, causes the CPU to accept certain control information from the keyboard, the printer, the CRT, the serial data channel control and the majik box.

Consider now the sixteen output channels. When output channels 1 and 2 are enabled, the CPU sends various state information of the keyboard latches and light the respective lights on the keyboard. When output channel 3 is enabled, the CPU sends data to the printer. When output channel 4 is enabled, the CPU sends data to the modem. When output channel 5 is enabled, the CPU sends the high part of the memory address to the memory address register in the majik box. When output channel 6 is enabled, the CPU sends the low part of the memory address to the memory address register in the majik box. Output channel 7 is used to load the address that controls the register selection. Output channel 8 regulates the flow of data to the general purpose registers of the CPU from the microcomputer. Channel 9 is a diagnostic execution time control to determine performance characteristics of the data display communication system 11. Channel 10 handles various status information. Channel 11 handles control for various peripheral devices. Channel 12 is the uncoded control for the audible alarm. When output channel 13 is enabled, the CPU sends various control information which will be more fully explained hereinafter, to the majik box command register. When output channel 14 is enabled, the CPU sends various control information to the printer, and the modem. When channels 15 and 16 are enabled, the CPU sends the high and low portion of a RAM memory address to the display.

Figure 5:
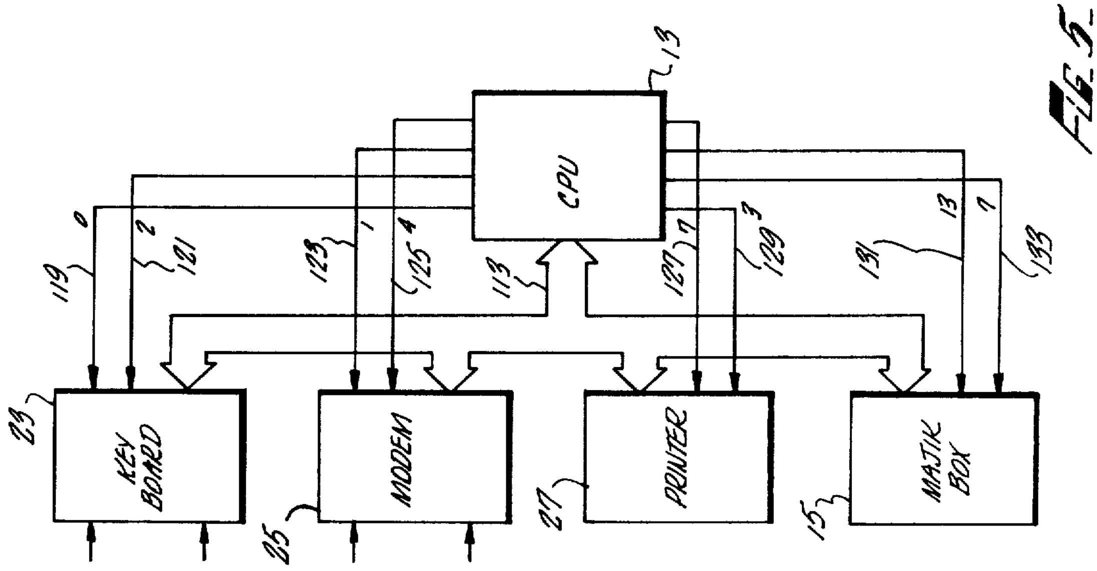
FIG. 5 is a block diagram illustration of the control interface between the central processing unit and the various devices peripheral to the central processing unit.

FIG. 5 more clearly illustrates the control and functional relationship between the CPU 13 and the peripheral equipment such as the keyboard 23, the modem 25, the printer 27 and the majik box 15 of the data display communication system. The keyboard 23, for example, has connected to it the various control lines such as lines 119 and 121 emanating from input channel decoder 95. These lines are part of the computer input control cable 115. Control line 119 enables input channel 0 which, as can be seen from FIG. 4, permits the keyboard to supply data to the CPU 13. Line 121 enables channel 2, which, as can be seen from FIG. 4, enables the keyboard to supply various control information to the CPU 13. This control information, by the way, is generated by the keyboard operator. The other control lines from the CPU to the keyboard that are dedicated to the keyboard peripheral unit are not shown, it being understood that they are present nevertheless.

The modem 25, likewise, has control lines dedicated to it running from the CPU 13. Thus, for example, line 123 is part of the computer input control cable 115 which causes input channel 1 to be enabled, permitting the modem to supply data to the CPU. Line 125 is part of output cable 117, and enables output channel 4. Enabling of this channel, as has been noted, permits the CPU to supply data to the modem.

The printer 27 also has certain control lines, such as lines 127 and 129 dedicated to it. Line 127 is part of the computer input control cable 115. It enables input channel 7 of the CPU, permitting certain printer control signals to be supplied from the printer to the CPU 13. Control line 129, on the other hand, is part of the computer output control cable 117, that enables output channel 3. This permits the CPU to send data to the printer.

The majik box 15, as will be more fully explained hereinafter, also has certain control lines dedicated to it. For example, line 131 is part of the output channel control cable 117 which enables output channel 13. This channel carries various control signals from the CPU to the majik box. Control line 133 is part of the computer input control cable 115. This control line enables input channel 7 which permits the majik box to send certain control information to the CPU. It should be remembered that these input and output channels are multiplexed on the data communication bus 113 which is an eight-bit bus.

Communication with Random Access Memory

Figure 6:
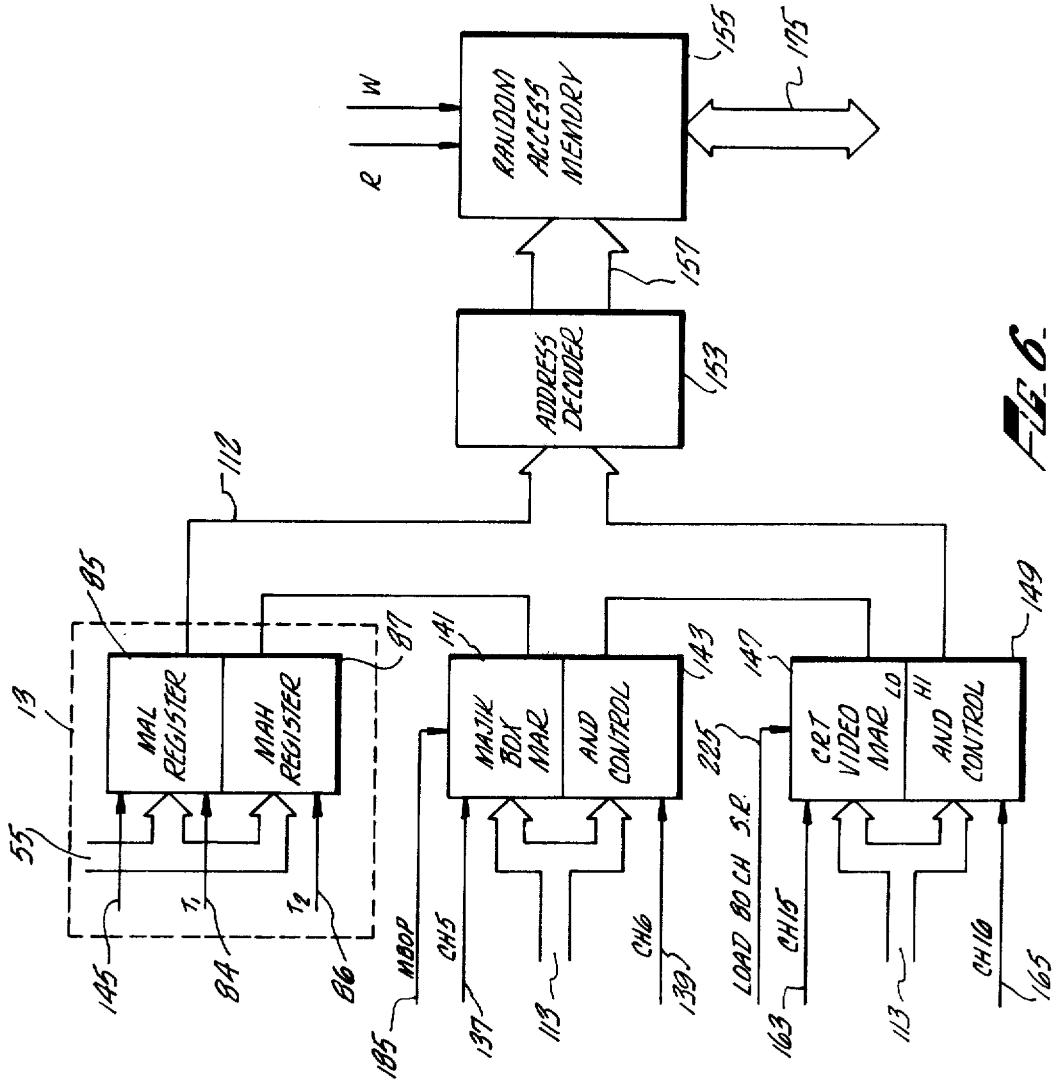
FIG. 6 is a block diagram illustration of how the central processing unit and various peripheral devices of the system address memory.

The CPU 13 (FIG. 6), the majik box 15 and the video display unit 21 communicate with the RAM 155 over a fourteen-bit memory address bus 112 which leads to an address decoder 153. The address decoder 153 generates the actual address over a fourteen-bit bus 157 that is supplied to the memory. This address identifies the location of character word in the memory 155. The operation performed by the memory, in other words either a read or write operation, is dictated by the read or write input signals to it from the CPU. The information that is to be stored or removed from the particular location in memory addressed by decoder 153, travels over the data bus 175.

The memory address register sections 85 and 87 of the CPU are loaded in sequence over the CPU internal data bus 55 upon control signals $T_1$ and $T_2$ enabling the registers 85 and 87, respectively, on lines 84 and 86, respectively. The contents of the MAL register 85 and the MAH register 87 of the CPU 13 are simultaneously supplied to the address decoder 153 upon an enable signal being present on line 145. It should be understood that the fourteen-bit address bus 112 is not considered limiting, the width of the bus is chosen for design convenience. It is well understood that the larger the memory address, the larger the number of locations in memory that may be addressed.

The majik box memory address register (MAR) is made up of an eight-bit section 143 and a six-bit section 141 to match the fourteen-bit address bus 112. It receives the address information over data bus 113 from the CPU 13 in two sections, the six-bit section is supplied to the register 141 first, in response to a command signal on line 137 which is the command enabling output channel 5 of the CPU. The eight-bit section of the MAR is transmitted over data bus 113 from the CPU at the time that the command signal on line 139, channel 6 enabling signal, is supplied to section 143. The combined fourteen-bit address is then supplied to the address decoder 153 at the occurrence of an operation command on line 185. Line 185 is the output channel 13 control line from output decoder 99.

The display unit 21 contains a memory address register that has a six-bit address section 149 and an eight-bit address section 147. The two sections of the memory address are supplied to the CRT video memory address register 147, 149 over data bus 113. The control signal on line 165, when enabled, causes the high section of the memory address to be supplied to register 149. Subsequently, the control signal on line 163 is enabled causing the low section of the memory address to be supplied to the register 147. Control line 165 is the enabling control for output channel 16 of the CPU. Control line 163 is the enabling line for output channel 15. The CRT video memory address register 147, 149 supplies the fourteen-bit address to the address decoder 153 when it receives a signal over line 225. Line 225, as will be more fully explained hereafter, carries a modulo 80 clocking signal. The CRT video memory address register 147, 149 is constructed similarly to the majik box memory address register 141, 143 in that, beside performing a storage function, the respective registers contain a counter therein that increments the contents stored in the register by one, upon receiving a command signal on line 225 and line 185, respectively.

In operation, the CRT memory address register, upon being supplied with an initial address that locates a particular character word in memory 155, the command signals received on line 225, in groups of eighty pulses causes the contents of the CRT memory address register 147, 149 to be incremented by eighty character word locations in the memory 155. Consequently, sending the starting address to the video memory address register 147, 149 will cause the memory 155 to read out eighty consecutively stored character words over data bus 175.

The majik box memory address register 141, 143 exhibits this same type of operation. In other words, upon being supplied with an initial character word address, the majik box memory address register 141, 143 is incremented eighty times causing the memory 155 to read out eighty consecutive character words or to write eighty consecutive character words into memory, starting at the address initially supplied to the majik box memory address register 141, 143. The eighty character length was chosen to be commensurate with the number of characters that could be displayed in one line of the screen of the display unit 21 (FIG. 1). If a display was used that could display more or less than eighty characters in one line, it would be desirable to read or write the number of consecutive character words from the memory 155 that could be displayed on one line.

The character word 183 (FIG. 7) stored in memory is twelve-bits wide. Therefore, the I/O bus 175 for the memory is twelve-bits wide. The character word 183 consists of a seven-bit character code 179 that identifies the alpha-numeric symbols to be displayed on the screen. The character code utilized, preferably conforms to ASC11 definitions. Beside this seven-bit ASC11 character code, each character word contains a one-bit cursor position 181, a one-bit underline position 187, a one-bit tab position 185, a one-bit protect position 183 and a one-bit highlight position 177. The meaning and function of bits 177 to 181 will be more fully explained hereinafter.

Majik Box

The majik box 15 (FIG. 8) receives control information and data from the CPU over the data bus 113 and the various control lines from the input/output decoders of the CPU. The majik box also supplies information to the CPU over data bus 113. The majik box communicates with the RAM 155 over the twelve-bit data bus 175.

The basic function of the majik box is to perform designated functions that relate to editing of information displayed on the screen, upon command from the CPU. In order to address memory, the majik box requires a memory address. This address is supplied by the CPU over data bus 113. As already explained, the memory address register 141, 143 of the majik box receives the fourteen-bit address in two sections, according to the sequence in which lines 137 and 139 are activated, line 137 carrying the output channel 5 control signal and line 139 carrying the output channel 6 control signal. After the memory address register 141 and 143 is loaded with the fourteen-bit memory address and the CPU desires a majik box to perform a particular function on information stored in RAM 155, a channel 13 control signal on line 185 is generated by the output channel decoder 99 of the CPU. This causes a particular command signal to be supplied to the function decoder 220 by the CPU, over data bus 113. The function decoder 220 determines what function is requested, and, in a well known manner, directs combinatorial function logic 230 to perform that operation upon the data received by it over twelve-bit data bus 227.

The operations of the majik box are subservient to the timing requirements of the display unit. Consequently, upon receiving an operation command signal on line 185 from the CPU, a flip-flop 187 is set, thereby generating a binary 1 on its output line 189 which is a first input to AND gate 191. The other input to AND gate 191 is the output of AND gate 197 on line 213. AND gate 197 generates an enabling signal on line 213 that passes the output of flip-flop 187 on line 189 through AND gate 191 on line 190 to flip-flop 193 when timing source 203 generates its modulo 80 pulse and the end of memory has not been reached. The signal on line 219 which is a first input to OR gate 199 indicates that the memory location addressed is the last location in memory. The signal on line 221 indicates a multi-line operation. If both conditions are present, there would be two binary zeros at the input of OR gate 199 causing AND gate 197 to be inhibited. On the other hand, if the end of memory signal were present as a binary 0 on line 219 and the multi-line signal on line 221 indicated a single line operation, as a binary 1, the output of OR gate 199 would be a binary 1, thereby enabling AND gate 197. Likewise, a lack of an end of memory signal on line 219 (binary 1) with a multi-line operation signal on line 221 (binary 1) will enable AND gate 197, as will a multi-line operation signal (binary 0) on line 221 in combination with a lack of an end of memory signal (binary 1) on line 219.

The end of memory signal is generated by an exclusive OR gate 211 which compares the known last memory address with the address in memory address register 141, 143. The multi-line operations signal is generated by the function decoder 220. The ultimate function of OR gate 199 is to enable AND gate 197, thereby causing flip-flop 193 to be set by flip-flop 187, if end of memory, in combination with a multi-line operation is not the situation.

When flip-flop 193 is set it generates an enabling signal on line 195 to AND gate 201 and the memory address register 141, 143, causing it to address RAM 155. AND gate 201 passes the clock signals generated by timing source 203 on line 196 to the combinatorial function logic 230, the eighty character shift register 205, and the memory address register 141, 143. The flip-flop enabling signal on line 195, however, will not be generated if the display unit utilized requires display refresh, as indicated by the signal on line 215.

Figure 9:
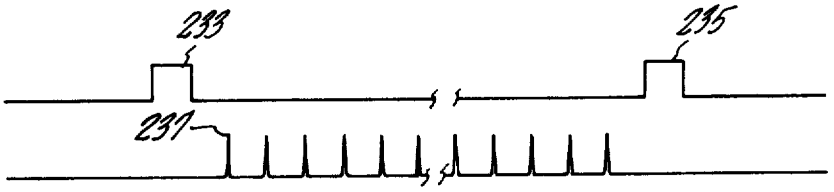
FIG. 9 is a pulse diagram that illustrates the relationship between the display pulses and the timing pulses for the majik box of FIG. 8.

In the case of a cathode-ray tube (CRT) display, the signals on line 215 are simply the horizontal sync pulses. As can be seen by reference to FIG. 9, the horizontal sync pulses 233, 235 which are sequential sync pulses bracket a series of clock pulses 237, the number of clock pulses 237 occurring between the horizontal sync pulses being equal to the number of characters per line that are to be displayed on the screen of the display unit. For the purposes of this particular example, this number is 80. The timing source 203 generates an output signal on line 223 each time eighty consecutive pulses are generated on line 196, thereby indicating that a new line is to start. However, this new line cannot occur until the horizontal sync pulse has occurred and caused flip-flop 193 to reset.

If it has occurred, the modulo 80 count pulse occurring on line 223 enables AND gate 197, causing flip-flop 193 to be set, thereby causing its output signal on line 195 to enable AND gate 201 to pass the clock signals on line 196 to the combinatorial function logic 230, the eighty character shift register 205, and the memory address register 141, 143. Consequently, the combinatorial function logic 230 performs its function on the eighty characters read from RAM 155. Each clock pulse increments the contents of the memory address register 141, 143 by one, in effect generating eighty character word addresses. The RAM 155 responds to these addresses by either reading out the character words contained therein or writing character words into the addressed locations, depending on the read or write control signals received.

The character words are read out over a twelve-bit data bus 175 through AND gate 209 which is enabled by the read command. After AND gate 209 the data travels over twelve-bit data bus 229, and is clocked into the eighty character shift register 205. Eighty characters are thereby read from RAM 155 in between the horizontal sync pulses that drive the CRT display.

From the above, it can be seen that whenever the majik box 15 is directed by the CPU 13 to perform a function, the CPU supplies it with a memory address that identifies the first character word of a sequence of eighty character words that are to be operated on. The CPU then supplies a function code to the function decoder 220. The decoder directs the combinatorial logic of the majik box to operate on these eighty characters. This operation will be performed, as directed, if the end of memory is not addressed at the same time that a multi-line operation is called for. The operation will be performed at a time when the display CRT does not need refreshing and the timing source is prepared to provide a full eighty pulse cycle. Upon the majik box starting its operation, as indicated by the signal on line 195, the CPU is interrupted and held quiescent until the majik box has completed its operation.

The majik box receives its function instructions from the CPU whenever the command signal on line 185 indicates that output channel 13 is operative. As can be seen from FIG. 4, this means six parallel lines of the eight line data bus 113 going to the function decoder 220 contain binary information thereon. Three of these six lines carry operation codes which will be more fully described hereinafter. Out of the other three bits, a particular single bit is used to direct the majik box to perform a read or write operation. Another particular bit is used to direct the majik box to operate in Mode B or Mode A. Another particular bit is used to direct the majik box to perform its operation in a multi-line or single-line mode.

The function decoder receives this information and, in a well known manner, generates appropriate control signals to combinatorial function logic 230 which performs the functions that will be more specifically defined hereinafter. The various lines from the function decoder 220 to the combinatorial function logic 230 are identified by words to illustrate the various functions that the decoder 220 instructs the majik box to perform. Thus, for example, the majik box can perform a simple move operation. That is, moving eighty word characters from one location in RAM 155 to another location in RAM 155. Other operations that can be performed are reset, pad, clear, tab set, tab clear, cursor tab and horizontal tab. Other instruction information that is received by the function decoder and passed on to the majik box are whether a read or write operation is to be performed (R/W), whether the operations are to be Mode B or Mode A (B/A) or whether the operations are to be multi-line or single-line operations (M/S). The combinatorial function logic 230, in a well known manner, assists in the performance of these functions, specifically by modifying the character words read from memory and performing various monitoring operations, in a manner which will be more fully described hereinafter.

As can be seen from FIG. 4, when output channel 10 is active, certain information regarding the status of the underline, highlight and protect flags in a character word or series of character words is dictated by the CPU. The CPU writes these flags directly into memory at the time a character word is stored in memory. If subsequent modification of these flags is required, the majik box will make these modifications with its circuitry.

Whenever an operation is to be performed on a particular character word in memory, an entire eighty character word line is read from memory and passed through AND gate 209 to the eighty character shift register 205. From the shift register 205, each character is passed to the combinatorial function logic 230 where it is operated upon and then returned to memory over data bus 233 through AND gate 207 and data bus 175 as directed by the memory address present in memory address register 141, 143. Certain other information such as will be described in connection with FIG. 10 is passed on back to the CPU over data bus 113.

Figure 7:
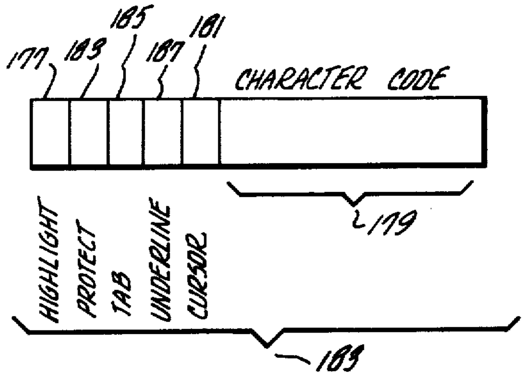
FIG. 7 is a schematic illustration of the word format utilized in the display portion of the data communication system.
Figure 8:
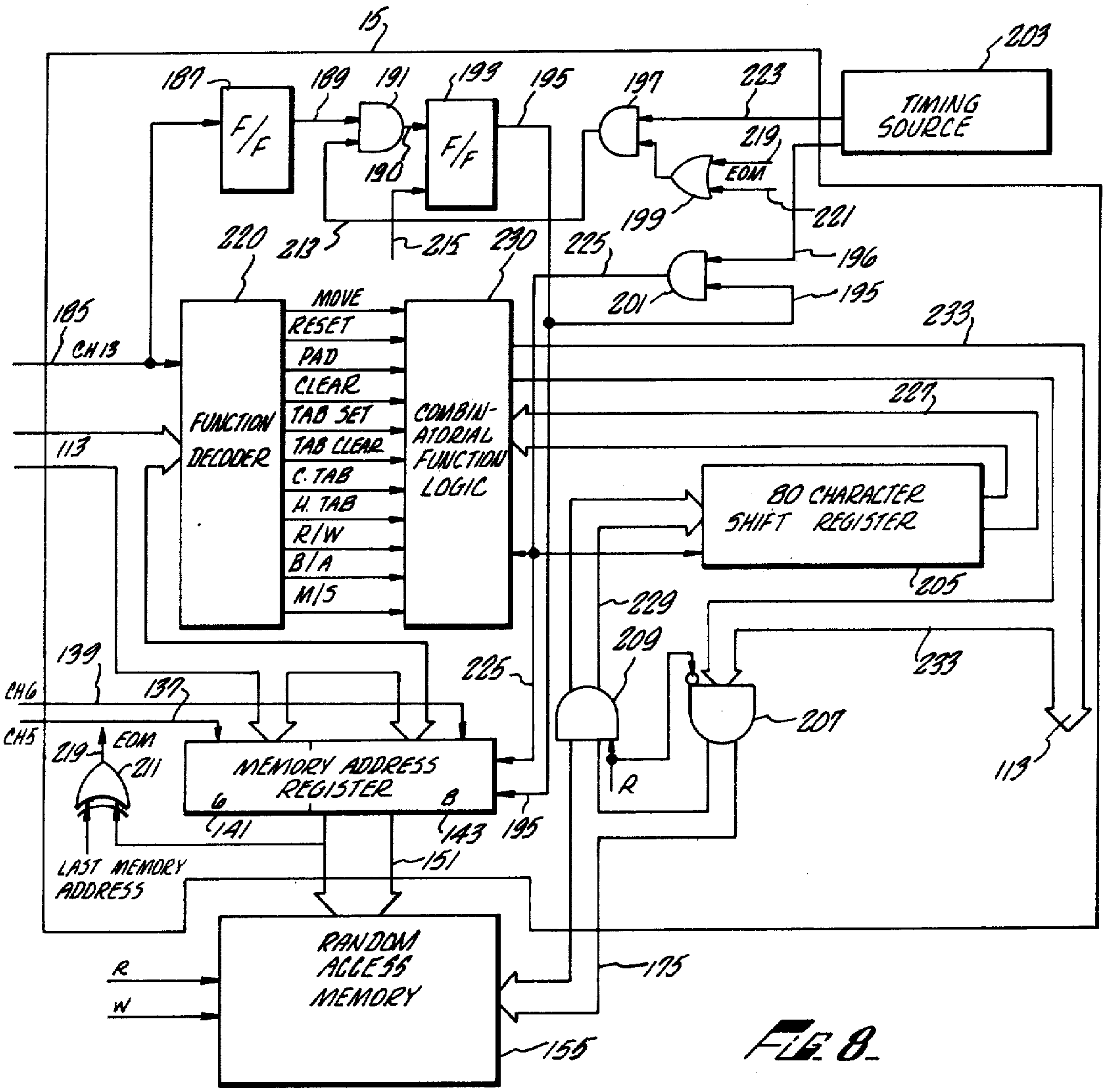
FIG. 8 is a block and logic diagram illustration of the structure of the majik box of FIG. 1.
Figure 10:
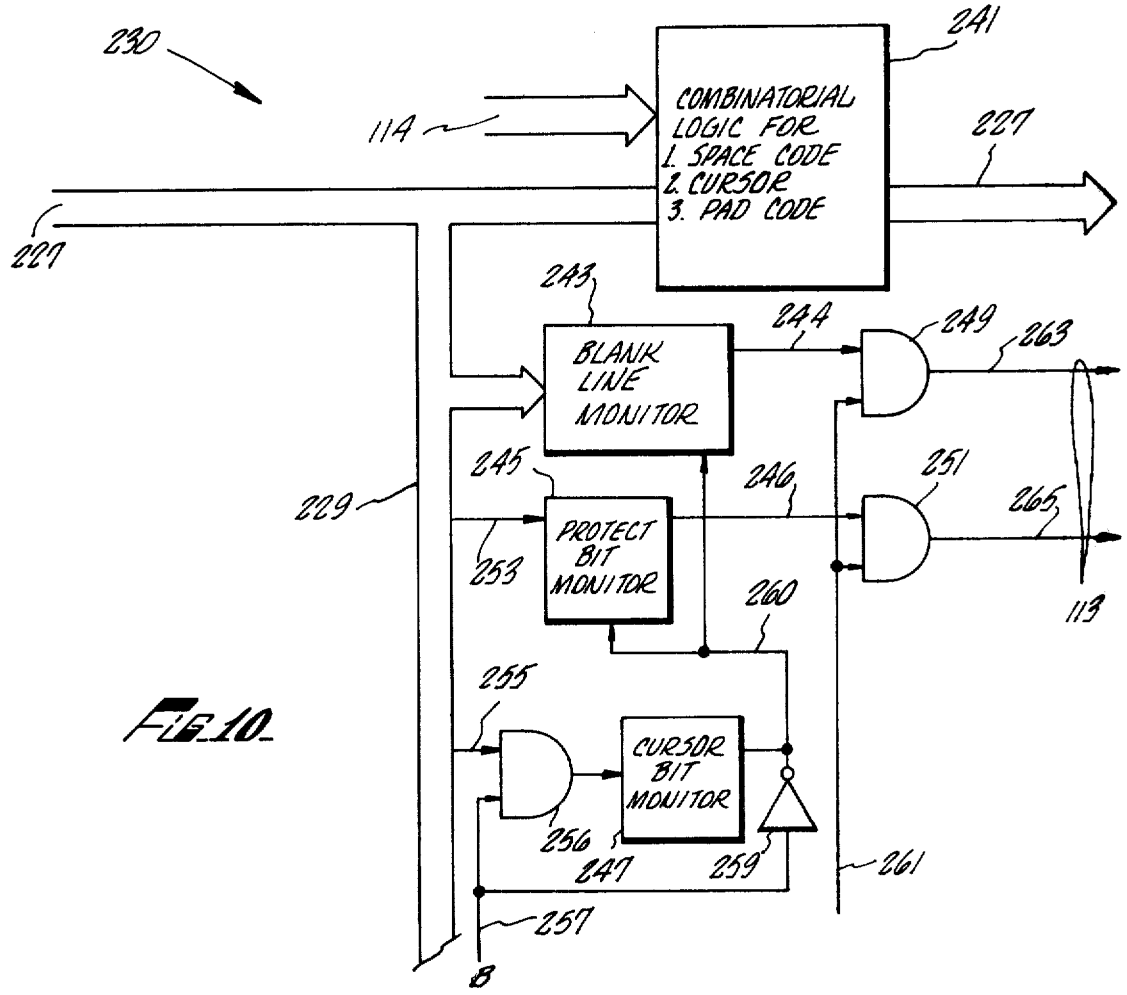
FIG. 10 is a block and logic diagram of a portion of the combinatorial function logic found in the majik box of FIG. 8.
Figure 11:
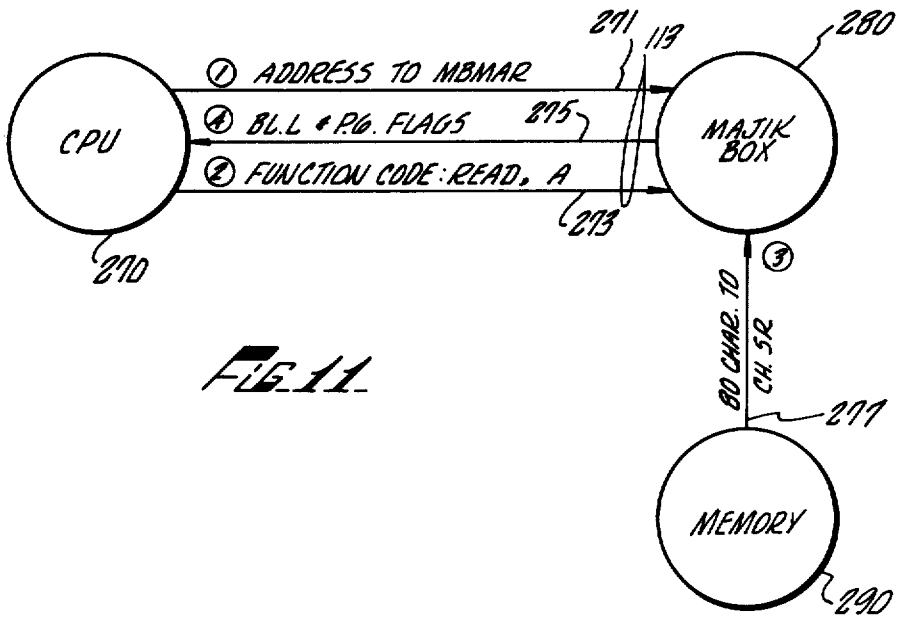
FIG. 11 is a functional flow chart of a Read Mode A operation performed by the data display communication system of FIG. 1.
Figure 12:
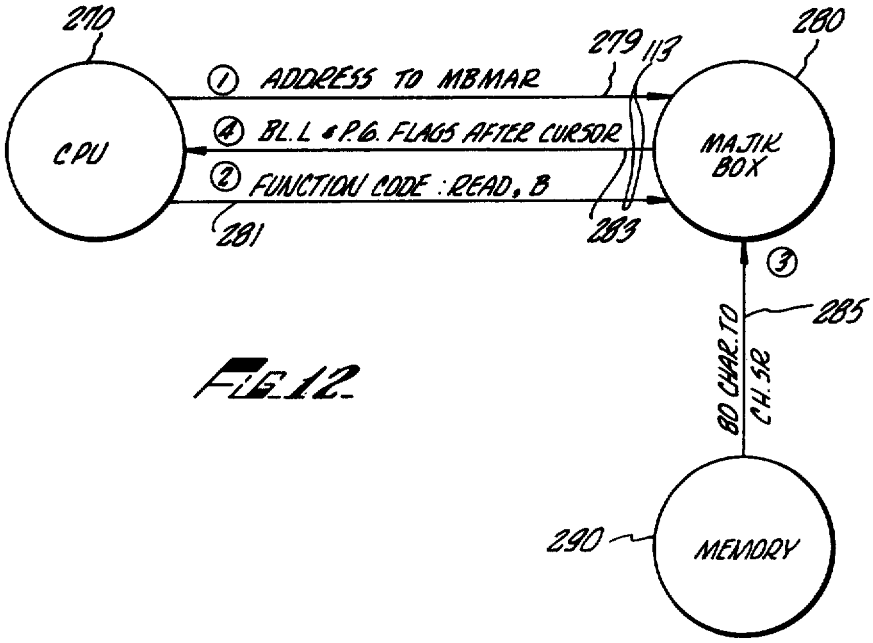
FIG. 12 has a function flow diagram of a Read Mode B operation performed by the data display communication system of FIG. 1.
Figure 13:
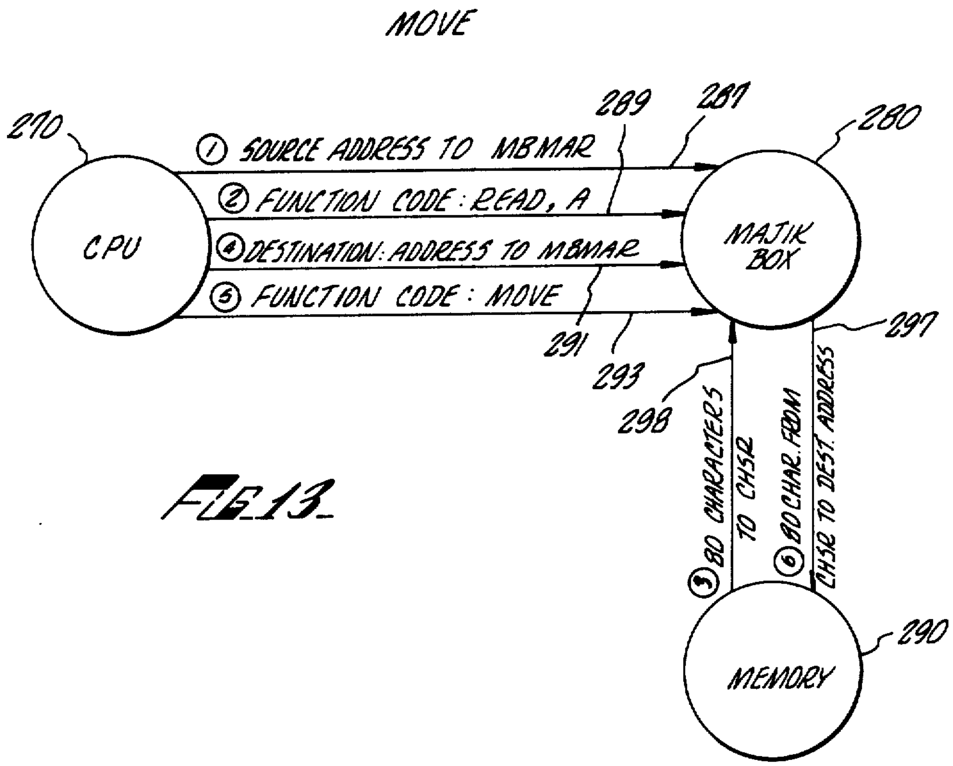
FIG. 13 is a function flow diagram of a Move operation performed by the data display communication system of FIG. 1.
Figure 14:
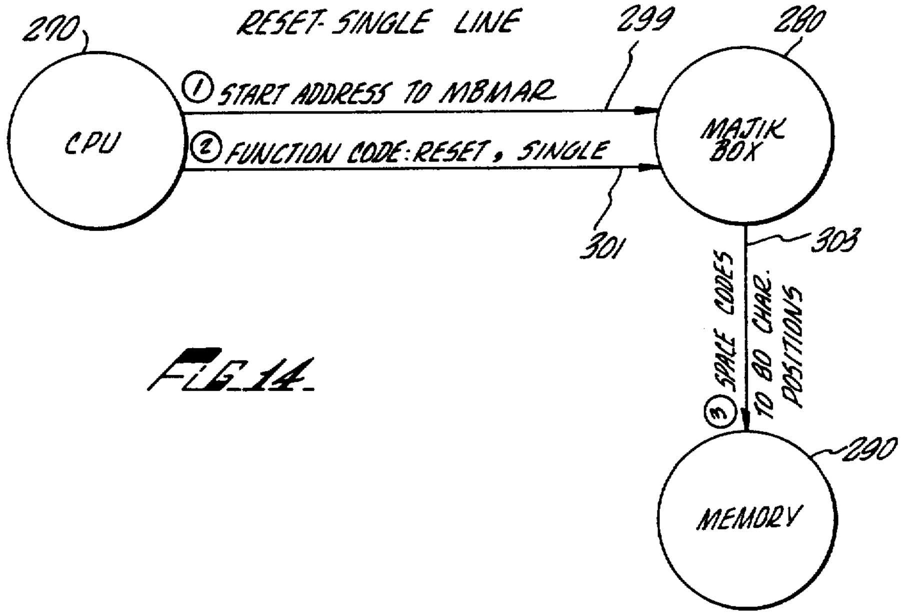
FIG. 14 is a function flow diagram of a Single Line Reset operation performed by the data display communication system of FIG. 1.
Figure 15:
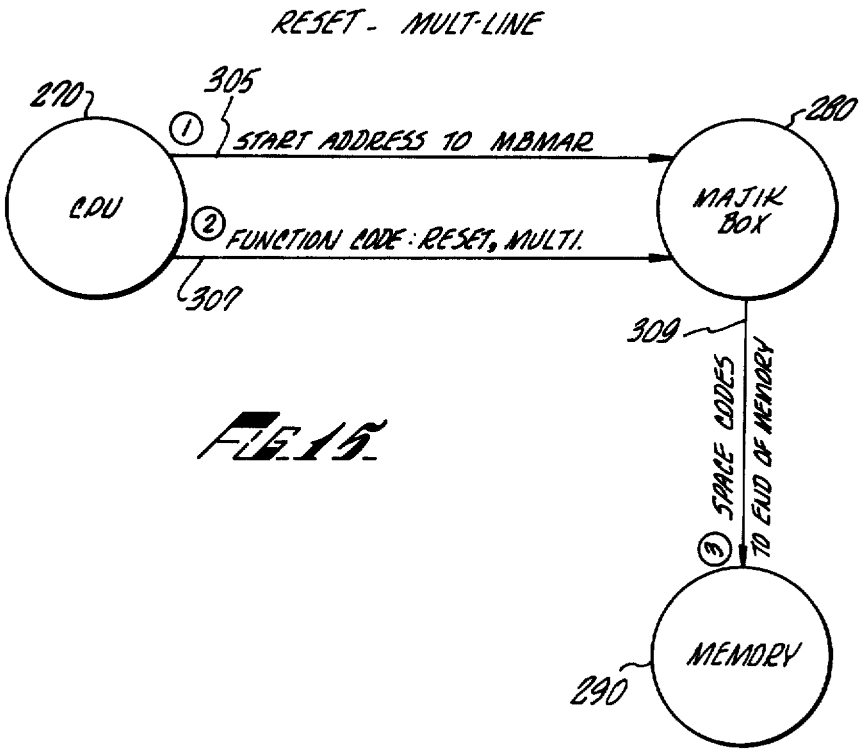
FIG. 15 is a function flow diagram of a Multi-line Reset operation performed by the data display communication system of FIG. 1.
Figure 16:
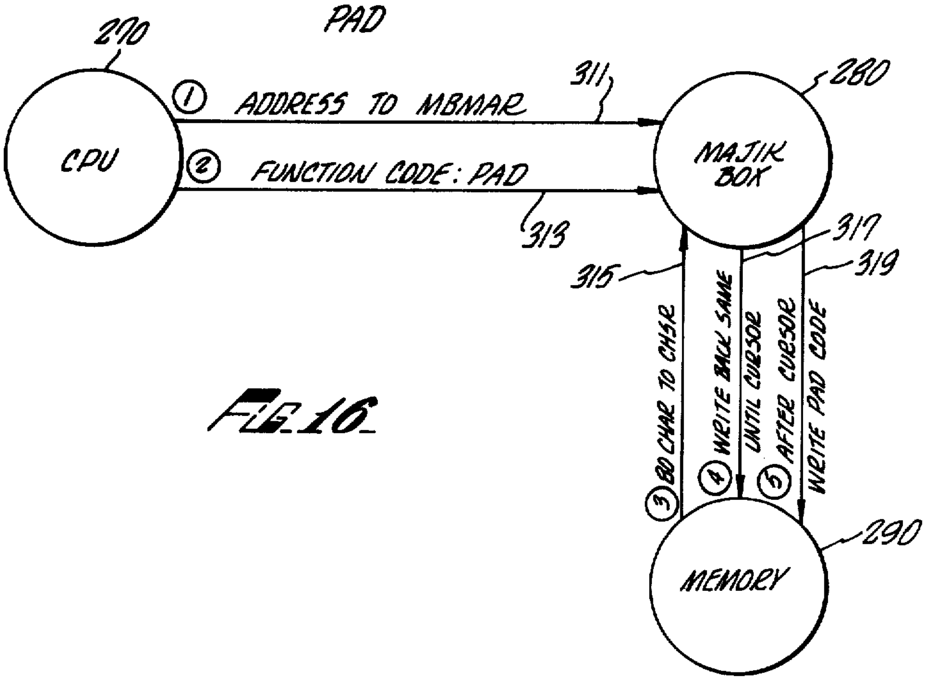
FIG. 16 is a function flow diagram of a Pad operation performed by the data display communication system of FIG. 1.
Figure 17:
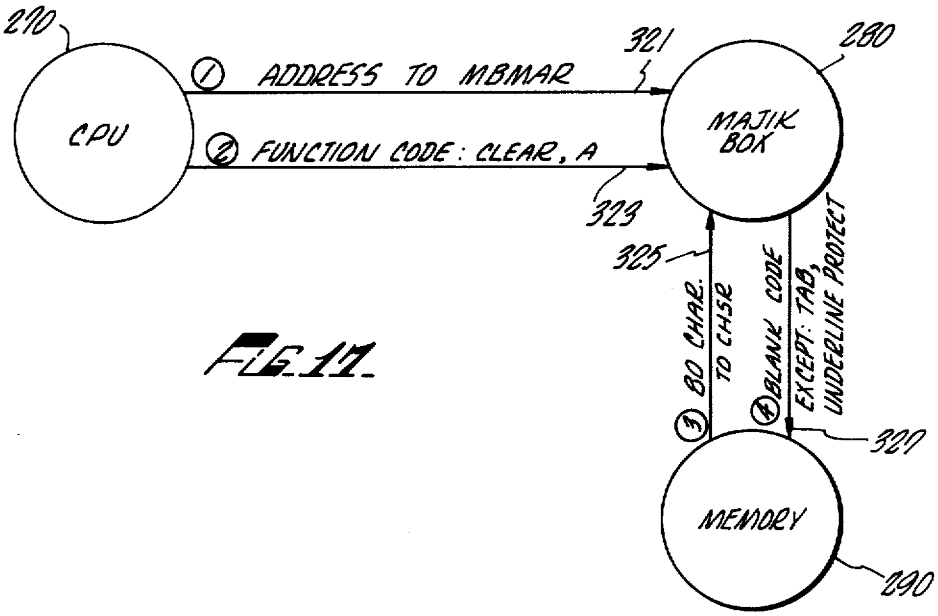
FIG. 17 is a function flow diagram of a Clear Mode A operation performed by the data display communication system of FIG. 1.
Figure 18:
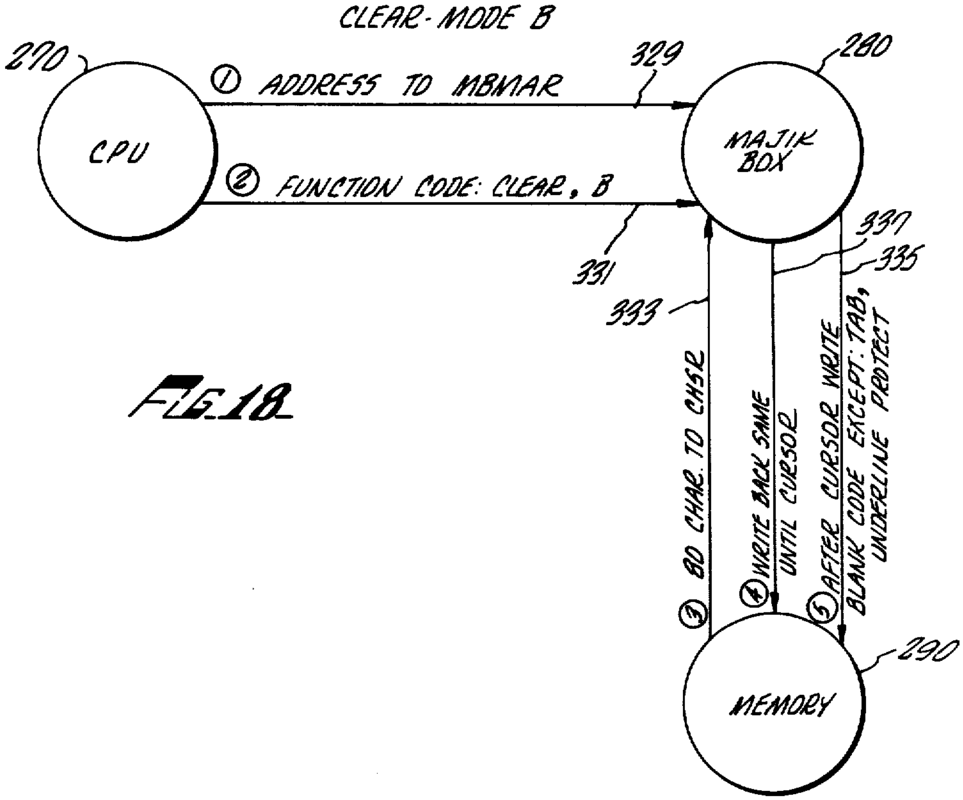
FIG. 18 is a function flow diagram of a Clear Mode B operation performed by the data display communication system of FIG. 1.
Figure 19:
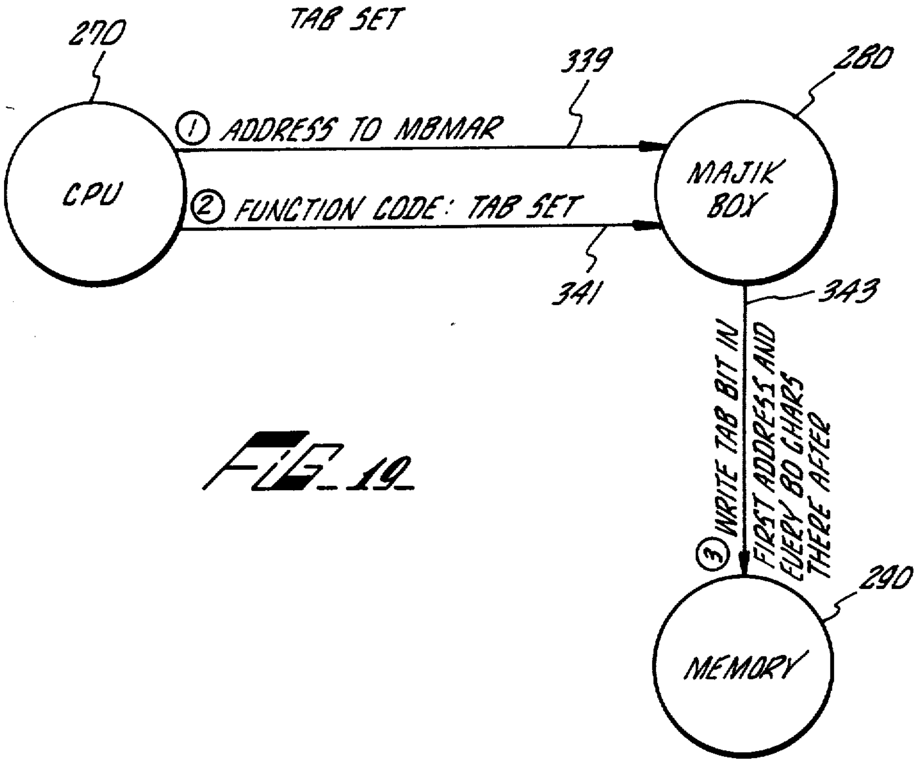
FIG. 19 is a function flow diagram of a Tab Set operation performed by the data display communication system of FIG. 1.
Figure 20:
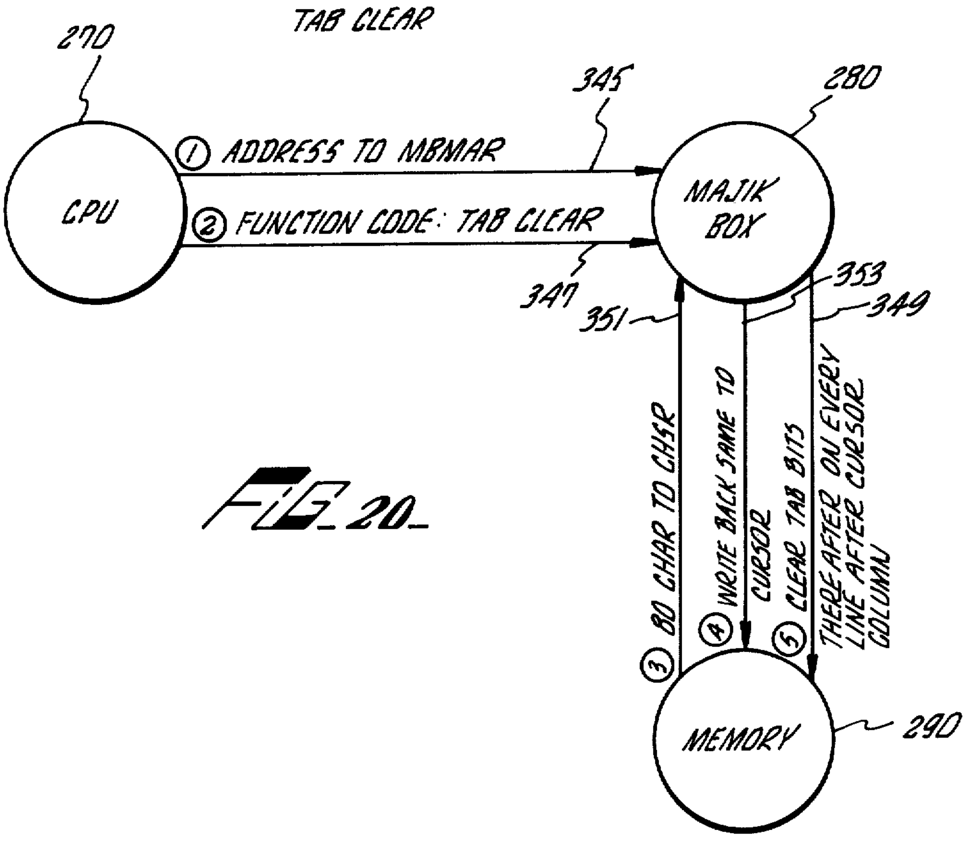
FIG. 20 is a function flow diagram of a Tab Clear operation performed by the data display communication system of FIG. 1.

FIG. 10 is a general illustration of some of the logic utilized to perform some of the more important functions of the combinatorial function logic 230. The data to be operated upon is received by the combinatorial logic 230 over a data bus 227, which is the output of the eighty character serial shift register 205 (FIG. 8). As the data is passed along, certain monitoring operations are performed on it. The data is monitored for space codes by blank line monitor 243 which simply looks at each character word to see if a space code is written into the character code section of the word. If a blank line is detected, meaning all pertinent character code positions 179 on the line contained the ASC11 code for the space character, a signal is generated by the blank line monitor on line 244. This signal is passed by AND gate 249 on line 263 which is part of the data bus 113, whenever the input channel 7 enabling command signal is provided by the CPU on line 261. Likewise, each character is monitored for a protect bit by protect bit monitor 245 which looks at the protect bit location of each character word (FIG. 7). If such a bit is present, protect bit monitor 245 generates a signal indicating the same on line 246. This signal is passed by AND gate 251 whenever the input channel 7 enabling signal is present on line 261. The signal then passes on its own line 265 back to the CPU.

Blank line codes and protect bits are monitored for continuously whenever the mode of operation of the majik box is Mode A. However, when a Mode B operation is called for, such monitoring occurs only from the cursor location. The definition of a Mode B operation calls for performing the designated function on the character words found after the cursor location. As a result, line 255 is connected to the line of the data bus which carries the cursor flag bit. Whenever a cursor bit is present, in other words a binary 1, AND gate 256 will pass that information to cursor bit monitor 247, if the signal on line 257 indicates that a Mode B operation is desired. In other words, the signal on line 257 is a binary 1. If a Mode A operation is desired, the signal on line 257 will be a binary 0. Consequently, inverter 259 generates a binary 1 on line 260 which enables both the blank line code monitor 243 and the protect bit monitor 245. This insures their operation whether a cursor bit is detected or not. When the signal on line 257, however, indicates that a Mode B operation is desired, the signal being a binary 1, the output of inverter 259 is a binary 0 on line 260, thereby causing blank line code monitor 243 and protect bit monitor 245 to not be enabled. These monitors are enabled when a cursor bit is detected on line 255 and passed by AND gate 256 to the cursor bit monitor 247, which, as a result, generates a binary 1 signal on line 260.

The combinatorial logic section 241 receives command information over data bus 14 from the CPU by way of function decoder 220. Such information sent by the CPU to the combinatorial logic section 241 consists of information that directs the operation of the majik box. In addition, the combinatorial logic contains space code generating logic which is simply a hardwire source for a particular multi-bit code. This code is written into a particular character word read from memory upon command from the CPU in a manner that will be explained hereinafter. The combinatorial logic section 241 causes the cursor flag bit to be moved from character word to character word according to the instructions provided the system, by an operator, through the keyboard. The combinatorial logic section 241 also contains pad code generating logic which generates a multi-bit code much like the space code logic.

The majik box operations relate mostly to communicating with the CPU and the RAM. It should be remembered at this point that the majik box functions all relate to operations that involve display of data, thereby requiring very fast function execution. FIGS. 11 through 20 indicate some of the basic operations performed by the majik box 280 as related to the display and manipulation of data in the data display communications system of FIG. 1.

Majik Box Operation

The various lines leading to and from the majik box circle 280 (FIGS. 11 through 20) to the central processor unit circle 270 and the memory unit circle 290, indicate the functional flow between these three hardwire sections.

A Read Mode A operation (FIG. 11) is defined as reading eighty character words from memory starting at the particular character word location in memory designated by the address 271 sent to the majik box memory address register. The CPU 270 then sends the function command 273, over channel 13, that indicates a Read Mode A operation. In response thereto, the majik box 280 reads eighty character words 277 from the memory 290, starting at the memory address supplied to it by the CPU. These eighty character words are stored in a character shift register of the majik box. Upon receiving the eighty character words, the majik box monitors each character word for a space code or a protect bit. If a blank line or a protect bit is encountered, the majik box transmits such information 275 to the CPU when input channel 7 of the CPU is activated.

A Read Mode B operation (FIG. 12) involves the CPU sending an address 279 to the memory address register of the majik box 280 and subsequently indicating that a Read Mode B 281 operation is to be performed. In response thereto the majik box 280 reads eighty characters 285 from memory beginning with the address sent to the majik box memory address register. The majik box, however, does not monitor for a blank line or protect bits until after the cursor bit is detected somewhere within the eighty character words being read from memory. After the cursor code is detected, the space codes and protect bits are monitored and, if detected, the flags for these conditions are sent back 283 to the CPU.

A Move operation (FIG. 13) is performed by the majik box 280 in the following manner. The CPU sends a first or source address 287 to the majik box 280 along with the indicator 289 that a Read Mode A function is desired. The majik box 280 responds by reading eighty character words 298 from the memory 290 starting with the character word stored at the address supplied to the majik box memory address register by the CPU. After the eighty character words are stored in the character shift register of the majik box 280, the CPU 270 supplies a second or destination address 291 to the majik box memory address register along with the indicator 293 that a move function is desired. The majik box 280 responds thereto by writing 297 in unaltered form, the eighty characters stored in the character shift register into the new memory location, starting with the destination address supplied to the majik box by the CPU.

A Single Line Reset (FIG. 14) operation is performed by the majik box 280 upon receiving a start address 299 in its majik box memory address register from the CPU 270 with a function code indication 301 that a Single Line Reset operation is to be performed. In response thereto, the majik box 280 writes space codes 303 into the memory 290 for eighty character word locations, starting with the address in the majik box memory address register.

A Multi-Line Reset operation (FIG. 13) includes the same three steps, a start address 305 in the majik box memory address register supplied by the CPU with an indication 307 that a Multi-Line Reset operation is to be performed. The only difference between a Multi-Line Reset and a Single Line Reset operation is that in a Multi-Line Reset operation the majik box writes space codes starting from the address indicated in the majik box memory address register to the end of memory. In a Single-Line Reset operation, space codes are only written into one sequence of eighty character words in memory.

A Pad operation (FIG. 16) by the majik box 280 involves the CPU 270 sending a memory address 311 to the majik box memory address register along with a function code 313 indicating that a Pad operation is to be performed. The majik box 280 responds by reading eighty characters 315 from memory, starting with the memory location addressed by the address in the majik box memory address register. These eighty characters are stored in the majik box character shift register. Upon receiving all eighty characters, the majik box begins to write back 317, unaltered, each character into the same location that it was read from until the cursor bit is detected. Upon the cursor bit being detected, the remaining characters in the eighty character shift register of the majik box are ignored and a Pad code is written 319 into memory in their place. This Pad code is a unique code chosen to indicate that no data can be entered in the character word locations in memory containing such a code.

A Mode A Clear operation (FIG. 17) is performed by the majik box 280 as follows. The CPU 270 sends an address 321 to the majik box memory address register along with a function code 323 that a Mode A Clear operation is to be performed. The majik box 280 responds by reading 325 from the memory 290 eighty character words starting with the character word addressed by the address in the majik box memory address register. Upon receiving these eighty characters in the character shift register of the majik box, the majik box 280 proceeds to write codes 327 into the unprotected character sections of the eighty characters just read from memory. The highlight bit is also cleared. The majik box does not clear any tab bits that are located within the character words nor does it effect the underline and protect bits, unless the respective underline and protect latches are in their appropriate positions, as directed by the CPU 270.

A Mode B Clear operation (FIG. 18) consists of the CPU 270 supplying an address 329 to the majik box memory address register, along with a Mode B Clear function code 331. The majik box 280 in response thereto, reads eighty characters 333 from the memory 290 into its character shift register. These eighty characters are then written back 337 into their same memory locations in memory 290 until the cursor bit is detected. After the cursor bit is detected, a space code is written 335 into each unprotected character word location for the remaining characters of the eighty originally read from memory. In addition, the highlight bit is cleared. The tab bit is not effected and the underline and protect bits are cleared only if the appropriate underline and protect latches are activated by the CPU in the majik box 280.

A Tab Set operation (FIG. 19) by the majik box 280 involves the CPU 270 sending an address 339 to the majik box memory address register along with a function code 341 that indicates a Tab Set is desired. The majik box responds thereto by writing a tab bit 343 into the character word at the location in memory 290 dictated by the address in the majik box memory address register. Upon having written a tab bit into the character word at that location, the memory address in the majik box memory address register is incremented by eighty consecutive addresses by the majik box 280, and another tab bit is written into the new character word address. This continues until end of memory is detected by the majik box. This procedure results in a tab bit being written in the character word first addressed by the CPU and every eightieth character word thereafter.

A Tab Clear operation (FIG. 20) involves the clearing of all tab bits from the character words, after the cursor bit has been detected. The CPU 270 sends an address 345 to the majik box memory address register, along with a function code 347 that a Tab Clear operation is to be performed. The majik box responds thereto by reading eighty characters 351 from the memory 290 starting with the address first received by the majik box memory address register. The majik box then proceeds to write these characters back 353 into their same locations in memory until the cursor bit is detected in one of the character words of the eighty character words read from memory. After the cursor bit is detected all tab bits, in the character words found after the character word containing the cursor bit, are cleared 349 from the remaining characters in the character shift register. The operation of clearing all tab bits is a multi-line function and continues line by line until the end of memory is detected by the majik box 280.

Conclusion

What has been described is a data display communications system wherein a microprocessor is utilized without the disadvantage of slow display connected operations. The flexibility provided by the use of the microprocessor and hardware uniquely adapted thereto facilitates the composition, verification and correction of data by way of a CRT or other display unit permitting the use of both unvariable and variable data that can be manipulated from the keyboard of the data display communications system.

Obviously, many modifications and variations of the present invention are possible in light of the above teachings. It is therefore, to be understood that within the scope of the appended claims, the invention may be practiced otherwise than as specifically described.

What is claimed is:

1. In a data display terminal communication system having a keyboard input device communicating with a microprocessor means, a random access memory means communicating with the microprocessor means for storing character data to be displayed under control of said microprocessor means, and a display means for displaying characters represented by the character data in said random access memory means on a line-by-line basis in response to said microprocessor means transmitting a memory address and control signals to said display means, the improvement comprising: p1 means for removing character data from and inserting character data into said memory means in blocks of N characters, in between the times said microprocessor means transmits a memory address and control signals to said display means, the inserting and removing being in response to said microprocessor means transmitting a memory address and control signals to said character data removing and inserting means, said character data removing and inserting means including;

shift register means for storing character data removed from said memory means in a block of N characters, N being the number of characters capable of being displayed on one line of said display means;

means responsive to instruction codes and command signals from said microprocessor means for modifying the character data block in said shift register means as instructed by said microprocessor means; and means responsive to control signals from said microprocessor means for inserting the character data block modified by the modifying means into said memory means at a location directed by the memory address transmitted to the display means by said microprocessor means.

2. The data display communication system of claim 1 wherein each character in the block of N characters comprises a character code and control information, each character code defining a particular character to be displayed on said display means, said control information including a cursor, underline, tab, protect, or highlight bit.

3. The data display communication system of claim 2 wherein said modifying means comprises:

means for monitoring for a blank line bit in the character data read from said shift register means; and means for monitoring for protect bits in the character data read from said shift register means, whereby detection of a blank line or protect bit causes the information identifying the characters containing either a blank line or protect bit to be transmitted to the microprocessor means.

4. The data display communication system of claim 2 wherein said modifying means comprises means for monitoring for a cursor bit.

5. The data display communication system of claim 4 wherein said modifying means further comprises means responsive to said cursor bit monitoring means detecting a cursor bit for enabling the blank line code monitoring means and the protect bit. monitoring means to monitor for blank line codes and protect bits.

6. The data display communication system of claim 2 wherein said modifying means comprises:
means for writing space codes in the character code locations in the block of N characters read from said shift register means.

7. The data display communication system of claim 2 wherein said modifying means comprises:
means for monitoring for a cursor bit in the N character block stored in said shift register means; and
means responsive to the monitoring means detecting a cursor bit for writing pad codes into the character code locations of the N character block thereafter.

8. The data display communication system of claim 2 wherein said modifying means comprises:
means for monitoring for a protect bit in the block of characters stored in said shift register means;
means for writing blank codes into the character code locations of the character block in said shift register means; and
means responsive to said monitoring means detecting a protect bit for inhibiting said blank code writing means.

9. The data display communication system of claim 8 wherein said modifying means further comprises:
means for monitoring for a cursor bit in the character block stored in said shift register means; and
means for disabling said blank code writing means until a cursor bit is detected by said cursor bit monitoring means.

10. The data display communication system of claim 2 wherein said modifying means comprises:
means for writing a tab bit into the tab bit location of the character addressed by the memory address and into every Nth character tab bit location thereafter.

11. The data display communication system of claim 2 wherein said modifying means comprises:
means for monitoring for a cursor bit in the character data read from said memory means into said shift register means; and
means responsive to said monitoring means detecting a cursor bit, for clearing the tab bits in the character data thereafter.

12. The data display communication system of claim 1 wherein said character data removing and inserting means comprises:
means for receiving a memory address for a character location in said random access memory means;
means for reading character data from said random access memory means into said shift register means to fill said shift register means starting with the first memory address in said address receiving means; and
means for writing said character data from said shift register means into said memory means, starting with a second memory address in said address receiving means.

13. A data display terminal communication system having a peripheral data input device and a display means for displaying characters on a line by line basis, said system comprising:
a random access memory means for storing data therein in multibit words, each word containing a character code and control information, each character code defining a particular character to be displayed on said display means, said control information including a cursor, underline, tab, protect, or highlight bit, said memory means supplying character codes to said display means;
a microprocessor means responsive to control signals from a peripheral input device connected to it for receiving data in the form of data words and control information from the peripheral device and transmitting the data words to said memory means for storage in a location directed by a memory address generated by the microprocessor means; and
a hardwire logic means responsive to control signals and a memory address from said microprocessor means, generated in response to reception of control information from the peripheral input device for removing a block of N words from said memory means, N being the number of characters capable of being displayed on one line of said display means, and responsive to control signals and a memory address from said microprocessor means for inserting the removed block of N words in said memory means.

14. The data display communication system of claim 13 wherein said hardwire logic means further comprises:
means for monitoring for blank codes in the character portion of the words read from said memory means; and
means for monitoring for protect bits as part of the control information in the words read from said memory means.

15. The data display communication system of claim 14 wherein said hardwire logic means further comprises:
means for receiving a memory address from said microprocessor means for a first character word location;
means for reading N character words from said memory means starting with the memory address in said receiving means; and
means for monitoring for a cursor bit in each word read from said memory means.

16. The data display communication system of claim 15 wherein said hardwire logic means further comprises:
means responsive to said cursor bit monitoring means detecting a cursor bit for enabling said blank code monitoring means and said protect bit monitoring means to monitor for blank codes and protect bits in the character words read from said random access memory means.

17. The data display communication system of claim 13 wherein said hardwire logic means comprises:
means for receiving a memory address from said microprocessor means for a multibit word location; and
means for writing space codes into the character code part of each multibit word removed as part of the block from said memory means, starting with the memory address in said address receiving means.

18. The data display communication system of claim 13 wherein said hardwire logic means comprises:
means for receiving a memory address from said microprocessor means for a multibit word location;

means for reading a block of N multibit words from said memory means starting with the memory address in said address receiving means;

means for monitoring for a cursor bit in the control information part of each word read from said memory means;

means for writing the N multibit words read from said memory means back into their same memory locations; and means responsive to said cursor monitoring means detecting a cursor bit in a multibit word for writing pad codes into the character code location of that multibit word and the Nth multibit word in each block of N words thereafter.

19. The data display communication system of claim 13 wherein said hardwire logic means comprises:

means for receiving a memory address from said microprocessor means for a first multibit word location;

means for reading a block of multibit words from said memory means, starting with the memory address in said address receiving means;

means for monitoring for a tab bit, underline bit, and protect bit in the words read from said memory means;

means for writing blank codes into the character locations of the multibit words read from said memory means; and means responsive to said monitoring means detecting a protect bit for inhibiting said blank code writing means.

20. The data display communication system of claim 19 wherein said hardwire logic means further comprises:

means for monitoring for a cursor bit in the words read from said memory means; and means for disabling said blank code writing means until a cursor bit is detected by said cursor bit monitoring means.

21. The data display communication system of claim 13 wherein said hardwire logic means comprises:

means for receiving a memory address from said microprocessor means for a first multibit word location; and means for writing a tab bit into the tab bit location of the control information part of the multibit word addressed by the memory address in said address receiving means and into every first multibit word of a block of N words thereafter.

22. The data display communication system of claim 13 wherein said hardwire logic means comprises:

means for receiving a memory address from said microprocessor means for a first multibit word location;

means for reading a block of N multibit words from said memory means, starting with the memory address in said address receiving means;

means for monitoring for a cursor bit in each multibit word read from said memory means;

means responsive to said cursor monitoring means detecting a cursor bit for clearing the tab bits in the multibit words thereafter read from said memory means; and means for writing the block of multibit words read from said memory means back into the same memory location.

* * * * *